(12) United States Patent
White

(10) Patent No.: US 7,152,633 B2
(45) Date of Patent: Dec. 26, 2006

(54) HEAT SHIELD

(75) Inventor: James E. White, Greenwich, OH (US)

(73) Assignee: Thermo-Tec, Greenwich, OH (US)

( * ) Notice: Subject to any disclaimer, the term of this patent is extended or adjusted under 35 U.S.C. 154(b) by 0 days.

(21) Appl. No.: 10/944,214

(22) Filed: Sep. 17, 2004

(65) Prior Publication Data

US 2005/0115625 A1    Jun. 2, 2005

Related U.S. Application Data

(60) Provisional application No. 60/503,707, filed on Sep. 17, 2003.

(51) Int. Cl.
*F16L 9/14*     (2006.01)

(52) U.S. Cl. ................. 138/149; 138/151; 138/158; 138/161

(58) Field of Classification Search .......... 138/149, 138/110, 158, 161, 167, 152
See application file for complete search history.

(56) References Cited

U.S. PATENT DOCUMENTS

| | | | |
|---|---|---|---|
| 2,719,099 A * | 9/1955 | Holbrook .................... | 138/149 |
| 3,233,699 A | 2/1966 | Plummer | |
| 3,346,016 A | 10/1967 | Blau et al. | |
| 3,434,502 A | 3/1969 | Snelling | |
| 3,614,967 A | 10/1971 | Royston | |
| 3,995,665 A | 12/1976 | Monaghan | |
| 4,026,381 A * | 5/1977 | Conley ....................... | 181/244 |
| 4,307,756 A | 12/1981 | Voigt et al. | |
| 4,345,430 A | 8/1982 | Pallo et al. | |
| 4,442,585 A * | 4/1984 | McGehee et al. ............. | 29/432 |
| 4,556,082 A | 12/1985 | Riley et al. | |
| 4,849,273 A * | 7/1989 | Skinner et al. ............. | 428/102 |
| 5,092,122 A | 3/1992 | Bainbridge | |
| 5,134,846 A | 8/1992 | White | |
| 5,139,839 A | 8/1992 | Lim | |
| 5,342,650 A * | 8/1994 | Daly, III ..................... | 427/178 |
| 5,407,743 A * | 4/1995 | Clough et al. .............. | 428/357 |
| 5,816,043 A * | 10/1998 | Wolf et al. ................... | 60/272 |
| 5,964,252 A * | 10/1999 | Simmons et al. ........... | 138/149 |
| 6,026,846 A | 2/2000 | Wolf et al. | |
| 6,041,595 A * | 3/2000 | Halimi et al. ................. | 60/323 |
| 6,251,498 B1 | 6/2001 | Fukushima et al. | |
| 6,338,366 B1 | 1/2002 | Williams | |
| 6,444,287 B1 | 9/2002 | Kalb | |
| 6,521,077 B1 | 2/2003 | McGivern et al. | |
| 6,585,078 B1 * | 7/2003 | Curtice et al. .............. | 181/252 |
| 6,855,298 B1 * | 2/2005 | TenEyck ...................... | 422/179 |

(Continued)

FOREIGN PATENT DOCUMENTS

DE       3404771       8/1985

*Primary Examiner*—James Hook
(74) *Attorney, Agent, or Firm*—Hahn Loeser + Parks, LLP; Bret A. Hrivnak

(57) ABSTRACT

The present invention relates to a heat shield for pipes and tubes that is flexible, has an interior insulating layer, and has an exterior reflective layer. A shield may include a flap extending from the shield body for covering a portion of the component not already covered by the shield body. The interior layer faces the exhaust pipe, is made of woven silica, and may include a conductive coating. The exterior layer is an aluminum finish. The heat shield may be secured with stainless steel clamps or a lace and installed on an installed pipe or tube. The heat shield may be installed with an air gap between the pipe and the heat shield.

20 Claims, 3 Drawing Sheets

U.S. PATENT DOCUMENTS

2003/0116116 A1    6/2003  Anton
2004/0079431 A1*   4/2004  Kissell ...................... 138/149
2005/0067038 A1*   3/2005  Kobayashi et al. ......... 138/149

* cited by examiner

HEAT SHIELD

This application claims the benefit of U.S. Provisional application No. 60/503,707 filed Sep. 17, 2003. Application Ser. No. 60/503,707 is hereby incorporated by reference.

TECHNICAL FIELD

The present invention relates to a heat shield for insulating pipes and tubes. More particularly, the invention relates to a heat shield for engine pipes and tubes that reduces heat transfer to and from such pipes and tubes for maintaining engine exhaust and intake temperatures.

BACKGROUND OF THE INVENTION

It is well known in the art that maintaining high exhaust temperatures and low intake temperatures for combustion engines increases the horsepower thereby produced. It is also well known in the art that pipe insulation reduces heat transfer, which both maintains internal pipe temperatures and protects the surrounding vehicle components from pipe temperatures.

Many methods of preventing heat transfer exist in the art; however, many are expensive, require disassembly of the exhaust system, do not cover the entire component, are not adaptable to various end-user size requirements, are not adaptable to systems that have multiple, concurrent size requirements, are bulky, and/or do not provide adequate thermal protection or insulation. Ceramic coatings exist but are expensive, require the component to be disassembled from the vehicle, and are not as effective for insulating as the present invention. Insulating sleeves or wraps are also used but also require disassembly of the component from the vehicle since these wraps are designed to slide onto pipes or tubes. Also, many of these sleeves are not flexible as they are either rigid or require a rigid protective cover. Insulating tapes are also used to insulate pipes, but these are difficult to apply, are not durable, unwrap, and are not as effective for insulating as the present invention. Also, many of these sleeves do not allow for their use on systems having a variety of concurrent size requirements, such as on a pipe having multiple diameters, a pipe system where a portion thereof benefits by an air gap between the sleeve and the pipe, or a pipe system that includes a component therein that is larger than the diameter of the pipe. Finally, many of these means of insulating either do not attempt to reflect radiant heat or are not as effective for reflecting radiant heat as the present invention. As it is important to protect the pipes from conduction, convection and radiation heat transfer, it is important to provide a means of insulation that incorporates both insulating material and reflective material.

Therefore, in light of the foregoing deficiencies in the prior art, the applicant's invention is herein presented.

SUMMARY OF THE INVENTION

The present invention is a heat shield for pipes and related engine components comprising an adaptable shield body sheet having an interior layer and an exterior layer and a means of securing the shield body to a pipe or tube.

In a second embodiment, the heat shield further comprises a shield flap extending from the shield body and covering a portion of the component not already covered by the shield body.

In a third embodiment, a method of insulating a pipe from heat transfer comprises the steps of placing a heat shield to a pipe and securing the heat shield with an air gap between the pipe and the heat shield.

These along with other objects and advantages of the present invention will become more readily apparent from a reading of the detailed description taken in conjunction with the drawings.

DETAILED DESCRIPTION OF THE INVENTION

Figure 1:
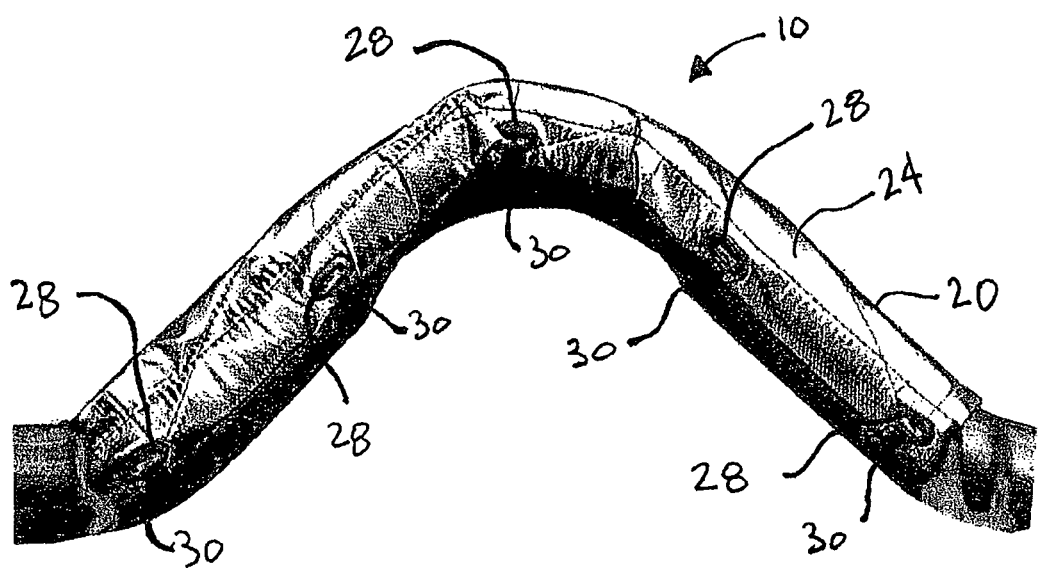
FIG. 1 is a side view of a heat shield, in accordance with a preferred embodiment of the present invention.
Figure 2:
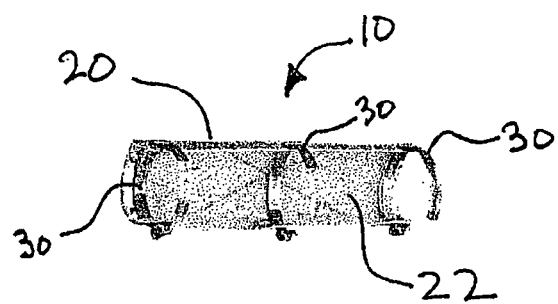
FIG. 2 is a bottom view of a heat shield, illustrated in FIG. 1.
Figure 3:
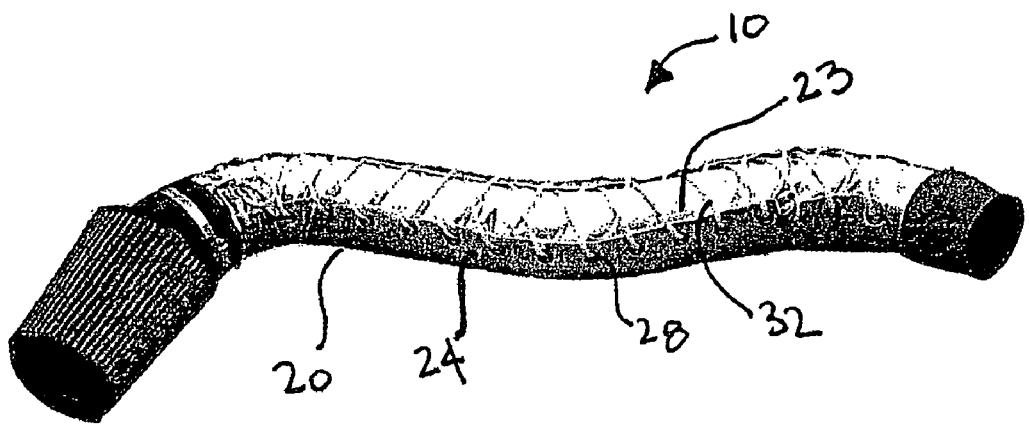
FIG. 3 is a perspective view of an alternative embodiment of the heat shield.

In FIGS. 1–2, the invention 10 is shown in a preferred embodiment. The heat shield 10 comprises a shield body 20, which is made from a sheet having an interior layer 22 and an exterior layer 24, and a means of attachment. It is contemplated that the shield body 20 may comprise two adjacent dual-layer sheets assembled to provide a shield body 20 composed of alternating interior 22 and exterior 24 layers. The aim of these layers and the invention are to reduce heat transfer (via conduction, convection, and radiation) to and from the component to which the shield 10 is attached. This benefits the specific component, adjacent or nearby vehicle components, and overall vehicle performance. More specifically, the primary use of the heat shield is to protect pipes, tubes, and other related components, collectively known as conduit.

In an embodiment, the interior layer 22 is made of woven silica fiber or any flexible material able to withstand temperatures in excess of 1100° F., such as ZETEX™ or ZETEX PLUS™, made by New Tex Industries, Inc, fiberglass or other high silica ceramic textiles. It is contemplated that the material used for the interior layer 22 may be thicker or thinner than $\frac{1}{16}$" and/or may be rated for lower temperatures as dictated by the desired application.

In an embodiment, the exterior layer 24 comprises a flexible aluminum MYLAR® finish (an aluminized polyester film) that aluminizes the exterior surface of the interior layer 22. MYLAR® (polyester film) is a product of DuPont. It is contemplated that any other comparable finish may be used, such as Teflon, also a product of DuPont. By using materials that are flexible, the heat shield is able to readily adapt to a variety of cross-sectional sizes and shapes, in addition to changes in direction along the conduit length.

Figure 5:
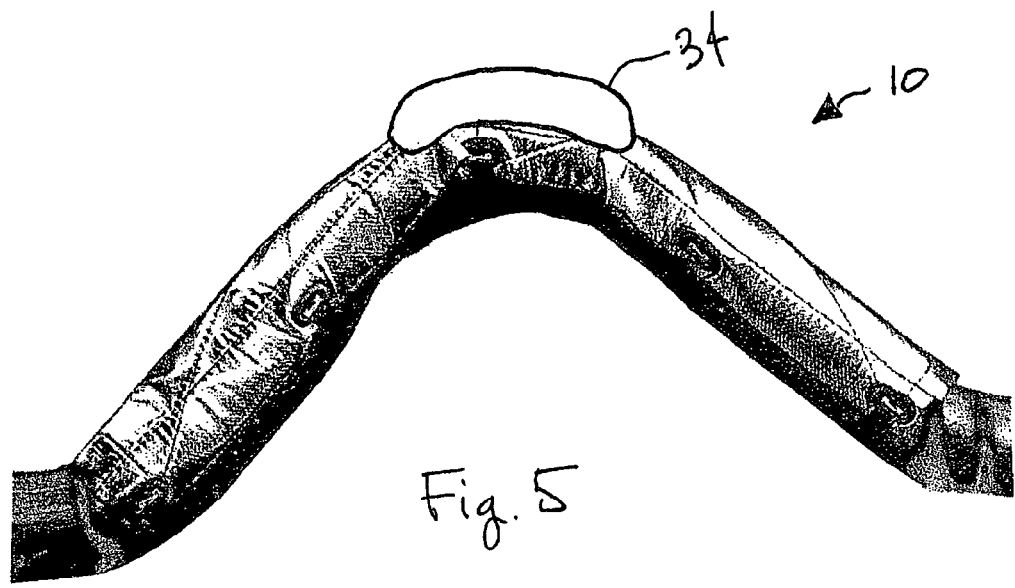
FIG. 5 is a side view of a heat shield having a local pocket, in accordance with an alternative embodiment.
Figure 6:
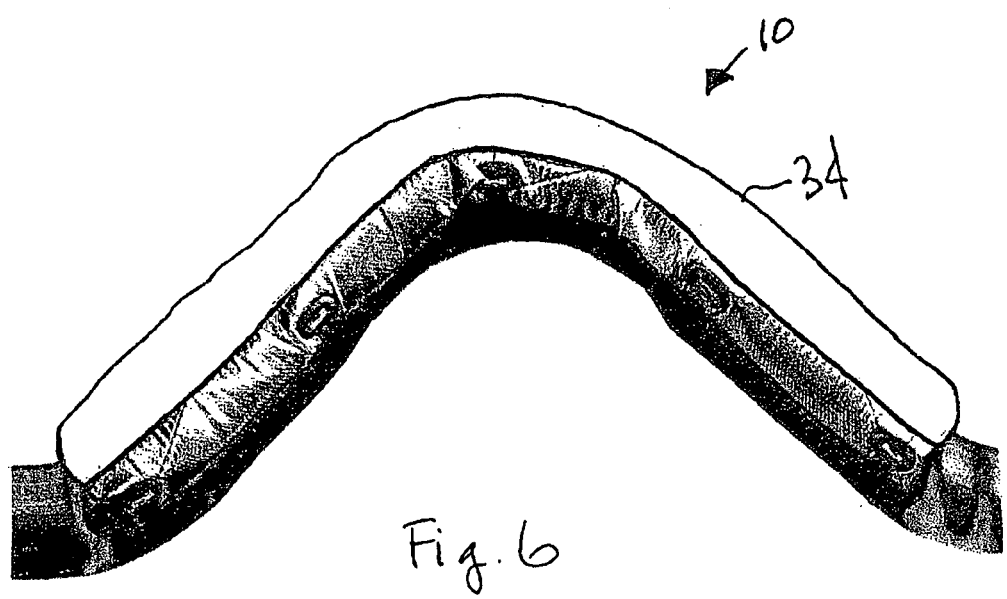
FIG. 6 is a side view of a heat shield having a full-length pocket, in accordance with an alternative embodiment.

It is contemplated that the shield body 20 may also include a pocket 34, which would allow additional material to be added—such as insulating material (i.e. the material used for the interior layer 22) or reflective material (i.e. the material used for the exterior layer 24). The pocket 34 may be located on the interior layer 22, the exterior layer 24, or between the layers. The pocket 34 may spatially run substantially the length of a layer (as seen in FIG. 6) or may be of a predetermined size and location (as seen in FIG. 5) so as to provide additional insulation or heat dissipation capacity to a predetermined, local area in accordance with a particular application.

Figure 4:
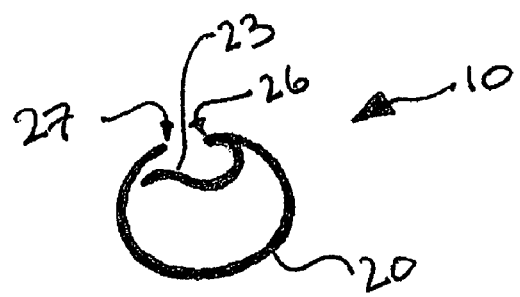
FIG. 4 is an end view of a the heat shield, illustrated in FIG. 3.

Depending upon the intended use of the shield 10, the shield 10 may or may not fully encompass the conduit. If the entire conduit is to be insulated in order to maintain its temperature or to protect it from numerous adjacent components, the shield 10 should fully encompass the conduit. Although a tubular design is contemplated, a non-continuously annular design is required to allow for the installation of the heat shield 10 on an installed conduit. Such a design includes a shield body 20 that substantially circumscribes the conduit and a flap 23, which attaches to edge 26 of the shield body 20, as seen in FIG. 4, and completes the circumscription of the conduit. The flap 23 is especially useful when using eyelets 28 and laces 32 to tightly secure the shield 10 to the pipe or tube. Also, the flap 23 allows the shield 10 to fit a range of conduit cross-sectional shapes and sizes, cover any components attached to the conduit, and adapt to any change in conduit direction, each as may vary along the length of the conduit. This eliminates the need to provide custom shields, instead allowing for one shield 10 to fit a range of conduit diameters. The free, non-attached end of flap 23 may lie over or under edge 27 or may be laced to edge 27 via laces 32. Flap 23 is made from the same or similar material used for the shield body 20. To prevent fraying, the edges of the shield body 20 may be folded and secured into such position by any available means such as stitching.

To secure the shield 10 to a component, various means may be used. In a preferred embodiment, eyelets 28 attach to the outer edge of the shield body 20 for use with commercially available clamps 30 or laces 32. In the alternative, the eyelets 28 may be located in the flap 23. It is contemplated that at least one eyelet 28 may exist, such as for use with clamps 30, or a series of eyelets may exist, such as for use with laces 32. It is further contemplated that eyelets 28 may not be used at all. In a preferred embodiment, eyelets 28, clamps 30, and laces 32 are made of any suitable material able to withstand temperatures in excess of 1100° F.; however, it is contemplated that material not able to withstand such temperatures may be used if a lower temperature application so dictates. In addition to the heat shield's ability to adapt to changes in the conduit's direction, these means of securing the heat shield to the conduit allow the shield, as a whole, to circumscribe a variety of conduit cross-sectional sizes and shapes, unlike the prior art.

The method used in mounting the heat shield 10 to a component also affects heat transfer reduction. Heat transfer along clamps 30 and eyelets 28 can be reduced by allowing the clamps 30 and eyelets 28 to be insulated from the heat source, such as by placing a portion of the shield body 20 between the clamps 30 and the heat source. For the shield body 20 or the flap 23 to protect clamps 30 from a heat source adjacent to the pipe or tube, the shield body 20 or flap 23 must include at least one pair of eyelets 28. This provides a configuration that allows the clamp 30 to secure the shield 10 to the pipe or tube while a portion thereof is protected from an adjacent heat source by the shield body 20 or flap 23 as the pair of eyelets 28 allow the clamp 30 to pass in an out of the shield body 20 and/or the flap 23. It is also contemplated that the eyelets 28 may be covered by the shield body 20 or flap 23. Also, leaving an air gap, typically between ¼ to ¾ inch, between the shield 10 and the respective component provides additional insulation for reducing heat transfer.

Although the present invention has been described in connection with the preferred embodiments, those skilled in the art will appreciate that modifications can be made and alternatives utilized without departing from the spirit and scope of the present invention.

The invention claimed is:

1. A heat shield for conduit comprising:
a flexible, single, continuous shield body sheet consisting of a conduit-facing interior layer and an exterior layer adjacent the interior layer, the sheet having first and second ends and first and second side edges and being capable of adapting to various conduit cross-sectional shapes and sizes and directional changes of the conduit longitudinal axis and not substantially adhering to the conduit, and the exterior layer being reflective; and
a means for coupling the side edges of the shield body to each other about the conduit such that a substantially longitudinal gap exists between the first side edge and the second side edge or the shield body sheet, such that the shield body is attached to the conduit without removal of the conduit from its installation.

2. A heat shield as stated in claim 1, further comprising a shield flap extending from a shield body side edge and capable of extending into a gap between first and second side edges.

3. A heat shield as stated in claim 1, wherein the interior layer has a conductive coating.

4. A heat shield as stated in claim 1, wherein the body sheet further comprises an accessible, insulation-receiving pocket capable of receiving insulating or heat dissipating material.

5. A heat shield as stated in claim 1, wherein the interior layer is woven silica.

6. A heat shield as stated in claim 5, wherein the exterior layer is a polyester film having a reflective aluminum finish.

7. A heat shield as stated in claim 6, wherein the coupling means includes at least one lace and at least one pair of eyelets, one eyelet located along the first side edge and the other located substantially opposite the other along the second side edge.

8. A heat shield as stated in claim 6, wherein the shield body sheet circumscribes the conduit less than one revolution.

9. A heat shield as stated in claim 6, further comprising an air gap between the conduit and the shield body sheet, wherein the gap is between ¼ inch to ¾ inch deep and the coupling means is a clamp.

10. A heat shield for conduit comprising:
a flexible, single, continuous shield body sheet consisting of a conduit-facing interior layer and an exposed exterior layer adjacent the interior layer, the sheet having first and second ends and first and second side edges and being capable of adapting to various conduit cross-sectional shapes and sizes and directional changes of the conduit longitudinal axis and not substantially adhering to the conduit, and the exterior layer being reflective; and
a plurality of conduit-mounting clamps, each clamp passing through a pair of apertures and a portion of each clamp being adjacent a portion of the interior surface of the body sheet.

11. A heat shield as stated in claim 10, further comprising a shield flap extending from a shield body side edge and capable of extending into a gap between first and second side edges.

12. A heat shield as stated in claim 10, wherein the body sheet further comprises an accessible, insulation-receiving pocket capable of receiving insulating or heat dissipating material.

13. A heat shield as stated in claim 10, further comprising an air gap between the conduit and the shield body sheet, the gap being between ¼ inch to ¾ inch deep.

14. A flexible, single, continuous shield body sheet consisting of a conduit-facing interior layer and an exterior layer adjacent the interior layer, the sheet having first and second ends and first and second side edges and being capable of adapting to various conduit cross-sectional shapes and sizes and directional changes of the conduit longitudinal axis and not substantially adhering to the conduit, and the exterior layer being reflective; and a plurality of conduit-mounting clamps capable of operably securing the body sheet to a conduit, where each clamp passes through a pair of apertures and a portion of the clamp is adjacent both a portion of the body sheet and the conduit.

15. A heat shield as stated in claim 14, wherein the body sheet further comprises an accessible, insulation-receiving pocket capable of receiving insulating or heat dissipating material.

16. A heat shield as stated in claim 14, further comprising an air gap between the conduit and the shield body sheet, the gap being between ¼ inch to ¾ inch deep.

17. A method of protecting a conduit from a heat source comprising the steps of:

wrapping a portion of a conduit with a flexible, single, continuous sheet so that the sheet is placed between the conduit and a heat source, the sheet consisting of a conduit-facing interior layer and an exterior layer adjacent the interior layer, the sheet having first and second ends and first and second side edges and being capable of adapting to various conduit cross-sectional shapes and sizes and directional changes of the conduit longitudinal axis; and securing the sheet to the conduit via a plurality of clamps, where each clamp passes through a pair of apertures in the sheet and a portion of the clamp is adjacent both a portion of the body sheet and the conduit.

18. A method of protecting a conduit as stated in claim 17, further comprising the step of placing insulating or heat dissipating material within an accessible, insulation-receiving pocket of the sheet.

19. A method of protecting a conduit as stated in claim 17, wherein the step of securing provides an air gap between the conduit and the shield body sheet, the gap being between ¼ inch to ¾ inch deep.

20. A method of protecting a conduit as stated in claim 17, wherein the conduit is an automotive exhaust pipe.

* * * * *